US012145834B2

(12) United States Patent
Jesse, Jr.

(10) Patent No.: US 12,145,834 B2
(45) Date of Patent: Nov. 19, 2024

(54) WATER LEVEL METER FOR HYDRATION PACKS

(71) Applicant: Everett Albert Jesse, Jr., Scottsdale, AZ (US)

(72) Inventor: Everett Albert Jesse, Jr., Scottsdale, AZ (US)

( * ) Notice: Subject to any disclaimer, the term of this patent is extended or adjusted under 35 U.S.C. 154(b) by 707 days.

(21) Appl. No.: 17/194,010

(22) Filed: Mar. 5, 2021

(65) Prior Publication Data

US 2022/0281736 A1 Sep. 8, 2022

(51) Int. Cl.

| | |
|---|---|
| ***B67D 3/00*** | (2006.01) |
| ***A45F 3/20*** | (2006.01) |
| *A45F 3/00* | (2006.01) |
| *A45F 3/16* | (2006.01) |

(52) U.S. Cl.

CPC .............. *B67D 3/0093* (2013.01); *A45F 3/20* (2013.01); *B67D 3/0077* (2013.01); *A45F 2003/003* (2013.01); *A45F 2003/166* (2013.01)

(58) Field of Classification Search

CPC .................. A45F 2003/166; A45F 3/20; A45F 2003/003; B67D 3/0077; B67D 3/0093; B67D 1/0801; B67D 1/0888; B67D 2001/1263; B67D 2210/00131

USPC .......................................................... 340/603

See application file for complete search history.

(56) References Cited

U.S. PATENT DOCUMENTS

| | | | | |
|---|---|---|---|---|
| 6,990,860 | B1 * | 1/2006 | Gillanders | G01F 23/0007 73/290 R |
| 2013/0319915 | A1 * | 12/2013 | Gellibolian | C02F 1/002 210/87 |
| 2017/0067770 | A1 * | 3/2017 | Sun | G01F 15/063 |
| 2017/0340147 | A1 * | 11/2017 | Hambrock | G01F 23/804 |
| 2018/0325246 | A1 * | 11/2018 | Kovac | B05B 1/3093 |
| 2018/0372524 | A1 * | 12/2018 | Saville | A45F 3/04 |

* cited by examiner

*Primary Examiner* — Hirdepal Singh

(74) *Attorney, Agent, or Firm* — Jacob M. Ward; Ward Law Office LLC

(57) ABSTRACT

An apparatus that monitors the consumption of a beverage containing vessel, while the vessel is contained in a pack, bag, or pocket. The method for monitoring includes a sensor that collects data on the beverage within the vessel, the data may be broadcast to other devices where the data is turned to information and it is displayed. The apparatus may consist of a battery, battery circuit, sensor circuit, temporary storage, sensor, and antenna. Information created may include a warning of when the vessel will be empty relative to the activity of the user.

18 Claims, 5 Drawing Sheets

WATER LEVEL METER FOR HYDRATION PACKS

TECHNICAL FIELD

The present invention relates to liquid level metering, and particularly to beverage liquid levels carried on one's person.

BACKGROUND ART

It is known in the prior art water level meters have existed for as long as water level storage has existed. Initially this was done by making charcoal or other markings on the side of natural water basins. Water level detection has expanded to nearly every form of storage vessel. Many containers have hash marks on them and are translucent which allows users to see the level. More advanced detection equipment have developed to make liquid level detection easier. Advanced level detection equipment uses electronic sensors which can report the water level electronically to computers.

Outdoor enthusiasts, law enforcement, fire fighters, and military members frequently use hydration equipment during activities and operations. This hydration equipment uses a pack of to hold a vessel containing a beverage. The vessel may be flexible. The pack may be mounted in numerous configurations and positions on the human body.

The only way to know how much water remains in the vessel is to remove the pack and check it manually by eye or touch. Checking the water level requires activity to be stopped. Users may be unable to stop their activity to check their beverage level or may simply forget. Not being able to check water levels in the packs during activity may put the user in a life-threatening position. The first indication they have ran out of water is they are out of water.

Advantages of Invention

The advantage of using the proposed invention include:

- Avoidance of life-threatening situation—this invention is intended to provide warning for individuals who are using vessels in packs, so they do not run out of beverages without making the appropriate preparations to be replenished or rehydrated.
- Improvement of athletic performance—having a better understanding of how much water is consumed during an activity allows the user to optimize consumption.
- Identify point of no return—users can identify when they are down to a specified water level and can identify a maximum distance they can travel or work before they need to refill.
- Improving cognitive performance—by cross referencing data with third party technology, hydration levels are optimized to ensure that cognitive performance is improved.

SUMMARY OF EMBODIMENTS

In accordance with the embodiments the product collects data relating to beverage consumption, then broadcasts it to a smart device to easily see.

DETAILED DESCRIPTION OF SPECIFIC EMBODIMENTS

Figure 1:
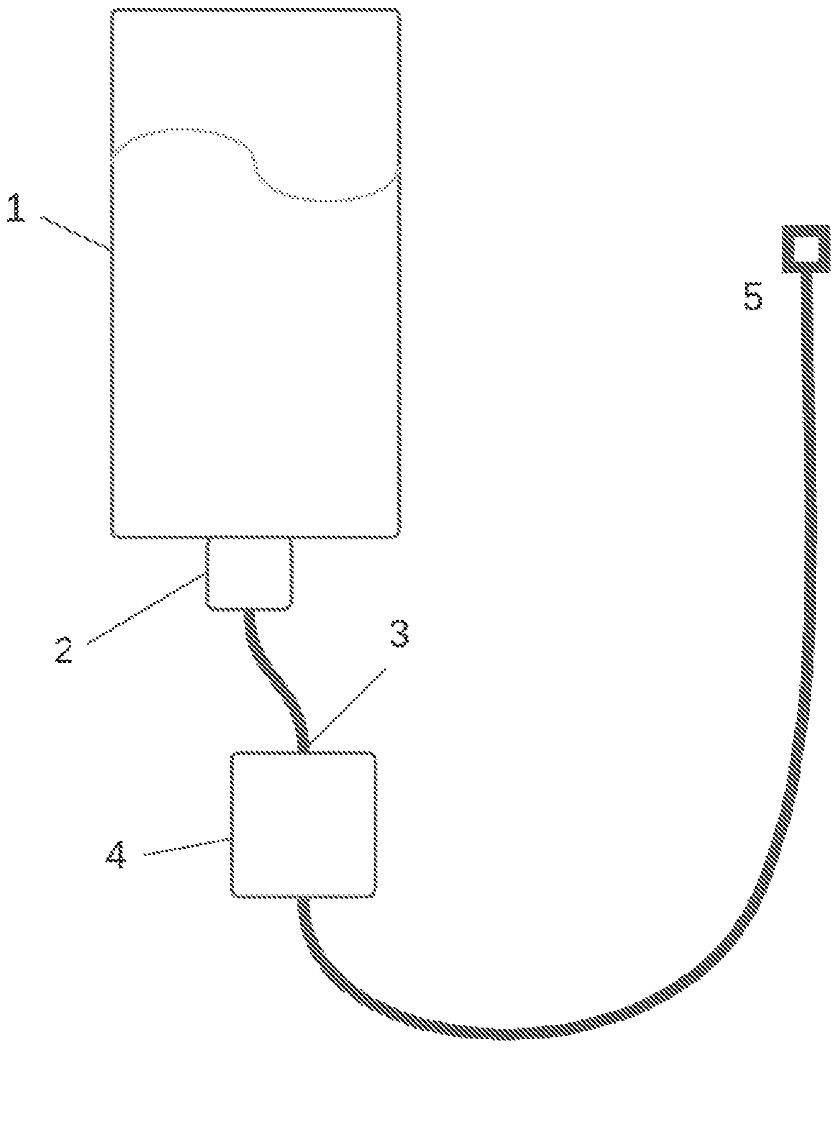
FIG. 1 illustrates the apparatus when it is placed between the vessel and the mouthpiece.

There are several embodiments which accomplish the objective of the product; however, the first embodiment which is illustrated in FIG. 1. is the best. This is due to the type of vessels which are common in packs and problems they cause for sensors.

Embodiment 1—The first embodiment uses a sensor which may contact the beverage or may be contactless. The sensor may sense the amount of water that passes from the apparatus. FIG. 1: illustrates how this may work in relation to the vessel 1.

The vessel used in packs may be made from a flexible material which like polyurethane; this means that the vessel is susceptible to shape changes from outside forces. An example of this would-be backpacking supplies which are being stored in a backpack with the vessel pressing up against backpacking supplies. The vessel is also susceptible to shape changes as the beverage is consumed and internal pressure causes it to collapse in on itself.

The vessel has a fitting 2 where the beverage is conducted out of the vessel for consumption. The fitting may have a straw 3 which delivers the beverage to a mouthpiece 5 where the beverage is delivered for consumption.

The apparatus is installed between the fitting and the mouthpiece. It may be installed at a convenient location along the length of the straw.

Figure 2:
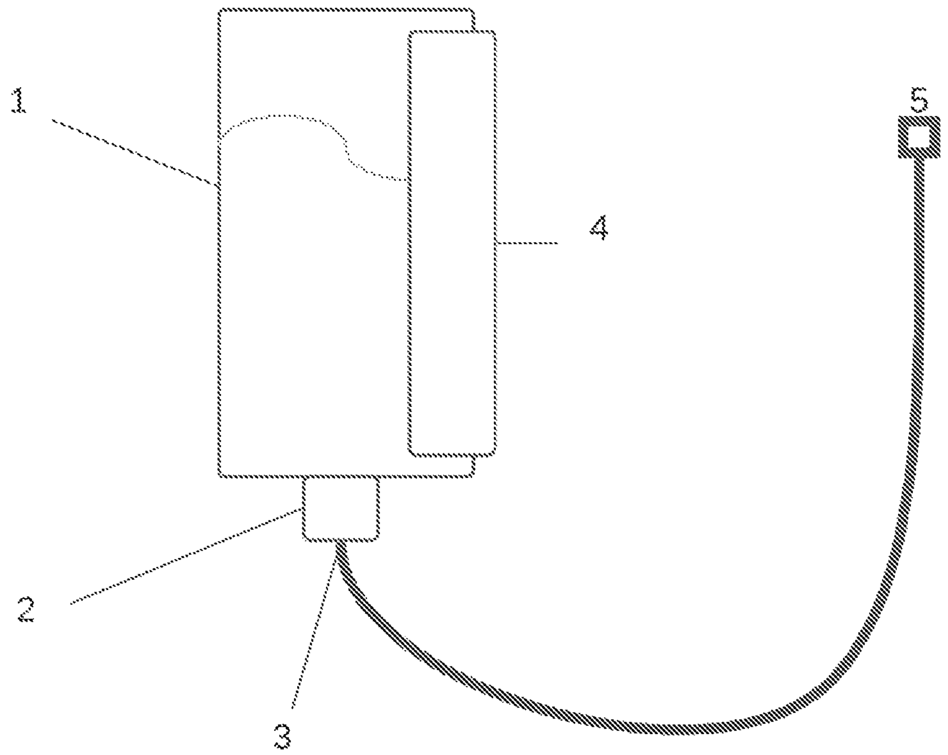
FIG. 2 illustrates the apparatus when it is placed on the exterior of the vessel.

Embodiment 2—the second best embodiment is illustrated in FIG. 2. It utilizes contactless sensor(s) which are mounted directly to the vessel 1. These sensors may have difficulty reading the liquid level of the beverage due to the changing shape of the vessel.

Similar to the first embodiment the vessel will have a fitting 2 where the beverage is conducted out of the vessel for consumption. The fitting may have a straw 3 which delivers the beverage to a mouthpiece 5 where the beverage is delivered for consumption.

Consider Embodiment 2 the apparatus 4 is fixed to the side of the container and uses contactless sensors to identify where the beverage is located within the container.

Figure 3:
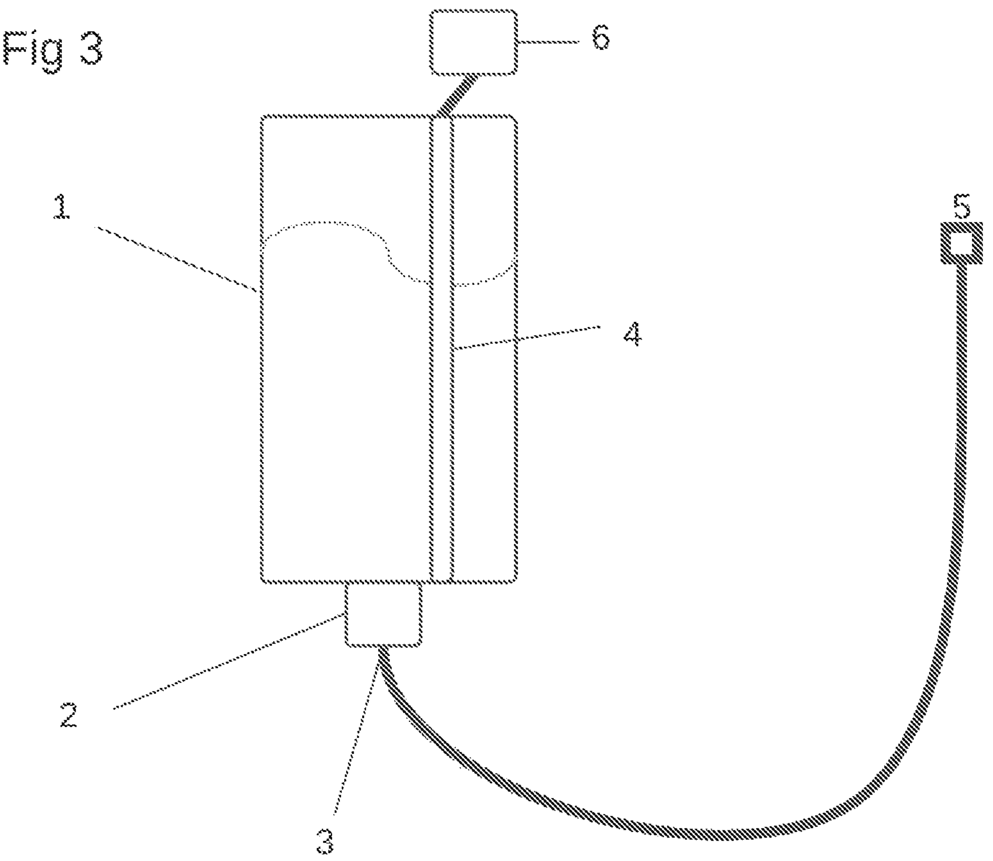
FIG. 3 illustrates the apparatus when it is placed on the interior of the vessel.

Embodiment 3—the least effective method is illustrated in FIG. 3. It utilizes sensor(s) which come into direct contact with the beverage while inside the vessel 1. These sensors are the types used as liquid level meters. They are excellent for detecting the liquid level when the vessel holding that liquid is a static shape. For example, a gas tank, water tank, or reservoir all are vessels which remain in a static shape. Using this method may cause a great inconvenience in regard to maintaining (keeping clean) the apparatus and vessel.

Similar to the first two embodiments the vessel will have a fitting 2 where the beverage is conducted out of the vessel for consumption. The fitting may have a straw 3 which delivers the beverage to a mouthpiece 5 where the beverage is delivered for consumption.

In Embodiment 3 the apparatus is in two parts the first part 4 is fixed to the inside of the vessel and contains sensors which contact the beverage to identify where the beverage is located within the vessel. The second part 6 is on the outside of the container and may have a wired or wireless connection to the apparatus within the vessel. The second part will be used to broadcast data observed by the sensors on the inside of the vessel.

Figure 4:
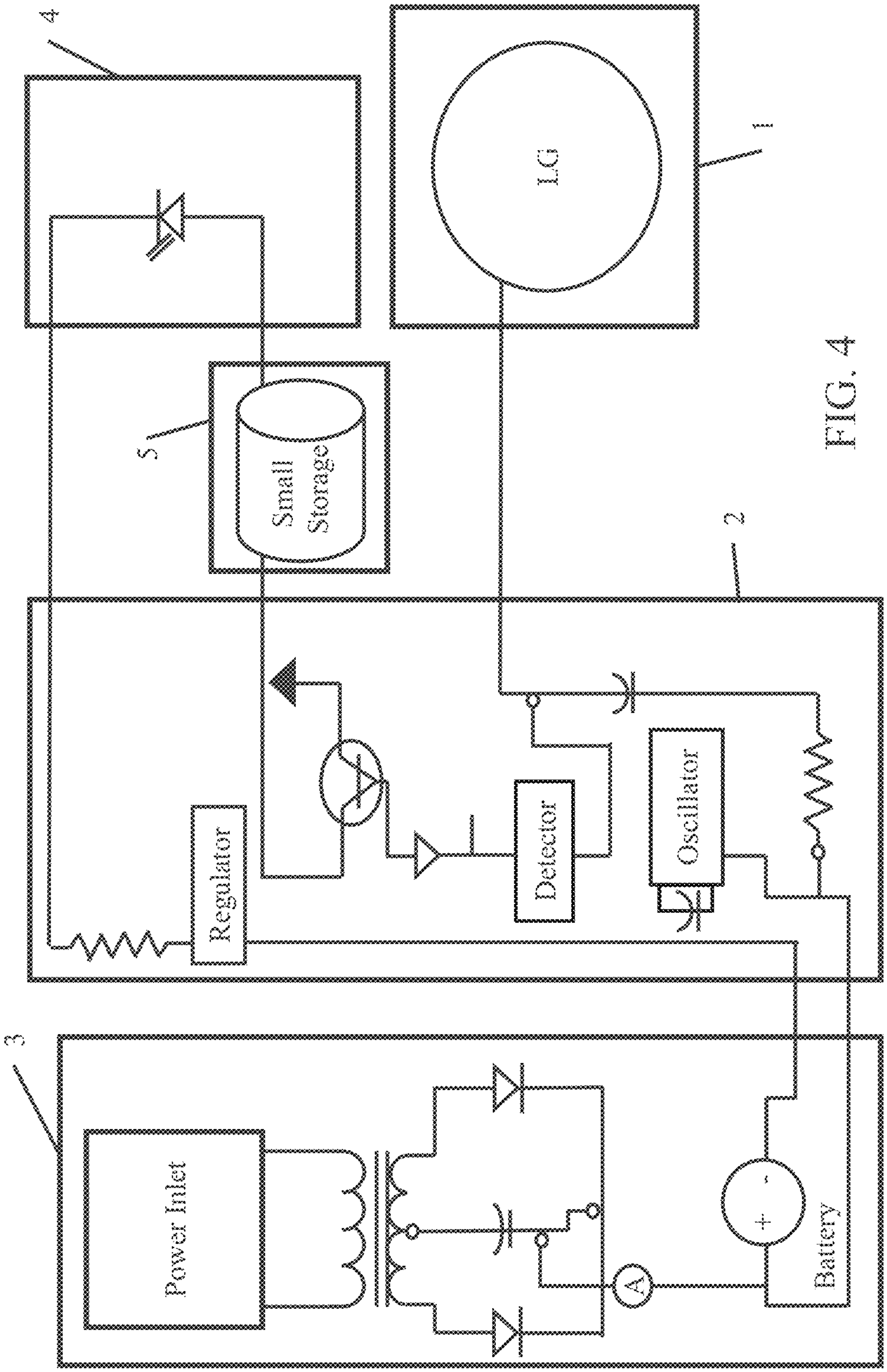
FIG. 4 illustrates the mechanical process of how the apparatus works.

Mechanical Process—Each of the embodiments have the same general form of construction. This form of construction is illustrated in FIG. 4. The constructed apparatus may be in a single housing or in several housings as it is suggested in Embodiment 3. Regardless of how many housings there are there should be the same components throughout each of the embodiment systems. These parts include a sensor 1, a sensor circuit 2, a battery and/or battery charging circuit 3, and a broadcast antenna 4.

The sensors described above may include flow sensors, float sensors, ultrasonic sensors, light sensors, motion sensors, and radiation sensors.

The sensor circuit may resemble the one illustrated in FIG. 4. 2. The sensor circuit may change within the specifications of the sensor manufacture.

The battery or battery charge circuit may resemble the one illustrated in FIG. 4. 3. The battery or battery charge circuit may change depending on the specifications set by the sensor manufacturer, the antenna manufacturer, the battery manufacturer, and/or the charger manufacturer.

The battery charge circuit may be eliminated leaving only the battery circuit.

The antenna broadcast a wireless signal transmitting the recorded data.

Embodiments may also include temporary data storage drive 5 within apparatus.

Figure 5:
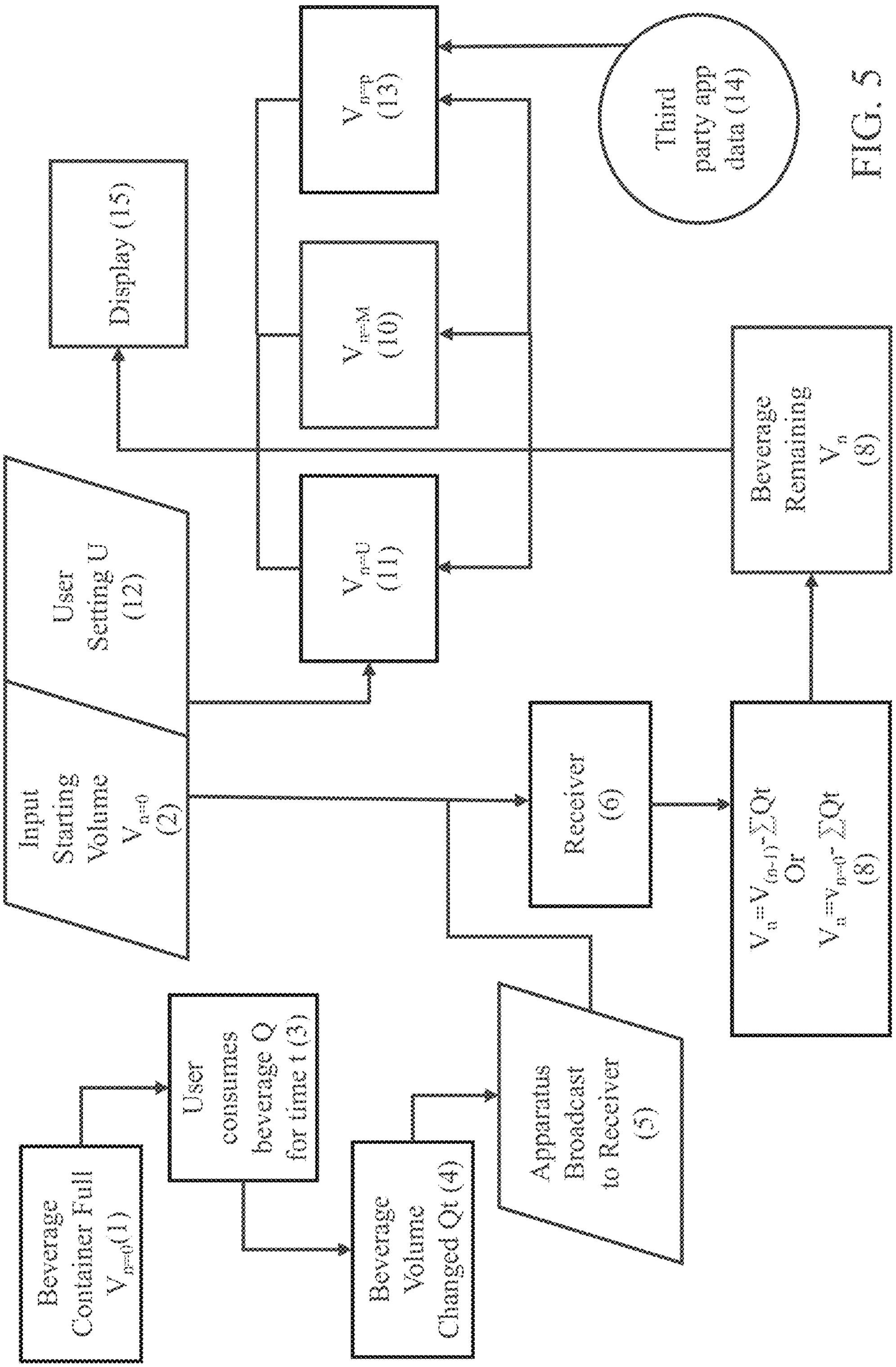
FIG. 5 illustrates the process for reporting data collected by the apparatus and transitioning it to actionable information.

Process of reporting FIG. 5 separated the apparatus from traditional level meters which merely report fluid levels. This process adapts the collected information to uniquely suit beverage consumption, as it relates to survival and improved performance.

Collection of initial input—this may be done automatically 1 by allowing sensor to report initial fluid level. It may also be done manually 2 by the user inputting the starting volume. In either case initial Volume is denoted by $V_{n=0}$.

Beverage is then consumed 3 represented by volumetric flow rate (Q) multiplied by time (t) which equals the change in volume ΔV. Q is the volumetric flow rate defined by Q=vA where v=flow velocity and A=cross sectional vector area/surface. Change in volume may also be $\Delta V=x_1-x_2$ where $x_1$ is the previous sensor reading and $x_2$ is the current sensor reading.

After consumption of the beverage the initial level $V_{n=0}$ is now changed to $V_n$ 4. The apparatus must solve for $V_n$.

The apparatus will then broadcast Qt 5 or store Qt on the temporary data storage as described above from FIG. 4.5. If there is no Q then there is no broadcast.

Qt is then received by a device 6 via the broadcast from the apparatus. The device will also receive any manual input from the user. The receiver receives data as Qt, $V_{n=0}$, or $V_n$.

The device must solve for $V_n$ 8. If no Qt or $V_n$ is received from the broadcast, then the equation default is:

$$V_n=V_{n=0}$$

If no Qt is received but a new $V_n$ is received that does not equal the previous $V_n$, then the previous $V_n$ becomes $V_{n-1}$ and the following equation is used to solve for $V_n$:

$$V_n=v_{(n-1)}$$

If Qt is received it cancels out any previous $V_n$ or $V_{n=0}$. When a Qt is received any $V_n$ or $V_{n=0}$ now becomes $V_{(n-1)}$ and the following equation is used to solve for $V_n$:

$$V_n=V_{(n-1)}-\Sigma Qt$$

or $$V_n=V_{(n-1)}-\Sigma Qt$$

A newly found $V_n$ 9 is then recorded within the device software. The new $V_n$ is displayed to the user via the display 15 or is used to create additional outputs.

There would be three types of modifications that may be made to $V_n$ which will then be reported through a display.

A modification may include $V_{n=M}$ 10 which are modification crated based on presets that are within the device software.

A modification may include $V_{n=U}$ 11 which are modifications which are influenced by settings/inputs created by the User 12. These inputs may include distance travelled, activity start time, calories burned, calories consumed, average heart rate, heart rate, body weight, body weight over time, altitude, outside temperature, body temperature, wellbeing indicator, previous beverage consumption, previous calorie consumption, stress levels, sweat rate, barometric data, regional data, location, age, height, sex, medications, disease data, sleep data and so on.

A modification may include $V_{n=P}$ 13 which are modifications that are influenced by inputs from third-party devices 14. These inputs received from third-party devices may include distance travelled, activity start time, calories burned, calories consumed, average heart rate, heart rate, body weight, body weight over time, altitude, outside temperature, body temperature, wellbeing indicator, previous beverage consumption, previous calorie consumption, stress levels, sweat rate, barometric data, regional data, location, age, height, sex, medications, disease data, sleep data and so on.

Display/Notify 15 the display or notification communicating the data and information may be through visual display on a smartphone, tv, monitor, wearable device, small device display. The data and information may also be transmitted through sound, bioimplants or haptics.

What is claimed is:

1. An apparatus configured for use with a hydration vessel, the apparatus comprising:

- a sensor configured to determine a fluid volume level within a hydration vessel;
- a sensor circuit configured to receive data from the sensor indicating the fluid volume level within the hydration vessel and further configured to arrange the received data for broadcast, wherein the sensor circuit is configured to receive an initial fluid level pre-loaded by a user;
- a broadcast antenna configured to receive the arranged data from the sensor circuit and further configured to transmit the arranged data to a smart device
- a power supply configured to provide power to the sensor, the sensor circuit and the broadcast antenna,
- wherein a consumption of fluid over time as determined by the sensor is represented by a volumetric flow rate multiplied by a change in time.

2. The apparatus of claim 1, wherein the sensor is positioned between an exit fitting of the hydration vessel and a mouthpiece.

3. The apparatus of claim 2, wherein the sensor is in contact with the fluid and has the form of a flow rate sensor.

4. The apparatus of claim 1, wherein the sensor is positioned adjacent to the hydration vessel.

5. The apparatus of claim 1, wherein the sensor is a contactless sensor and has the form of a fluid volume sensor.

6. The apparatus of claim 1, wherein the sensor is positioned within an interior of the hydration vessel.

7. The apparatus of claim 6, wherein the sensor is in contact with the fluid and has the form of a fluid volume sensor.

8. The apparatus of claim 1, wherein the sensor circuit is configured to compare the fluid level as determined by the sensor with the initial fluid level.

9. The apparatus of claim 1, wherein a temporary data storage unit is configured to receive the arranged data from the sensor circuit prior to transmission by the broadcast antenna.

10. A method of using an apparatus with a hydration vessel, the method comprising the steps of:

arranging a sensor to determine a fluid volume level within a hydration vessel;

receiving data from the sensor with a sensor circuit indicating the fluid volume level within the hydration vessel, wherein the sensor circuit is configured to receive an initial fluid level pre-loaded by a user;

arranging the received data to prepare for broadcast;

using a broadcast antenna to broadcast the received data to a smart device; and providing a power supply to provide power to the sensor, the sensor circuit and the broadcast antenna, wherein a consumption of fluid over time as determined by the sensor is represented by a volumetric flow rate multiplied by a change in time.

11. The method of claim 10, including the step of positioning the sensor between an exit fitting of the hydration vessel and a mouthpiece.

12. The method of claim 10, including the steps of contacting the fluid with the sensor and arranging the sensor as a flow rate sensor.

13. The method of claim 10, including the step of positioning the sensor adjacent to the hydration vessel.

14. The method of claim 10, including the step of using a contactless sensor.

15. The method of claim 10, including the step of positioning the sensor within an interior of the hydration vessel.

16. The method of claim 15, including the steps of contacting the fluid with the sensor and arranging the sensor as a fluid volume sensor.

17. The method of claim 10, including the step of comparing the fluid volume level as determined by the sensor with the initial fluid volume level.

18. The method of claim 10, including the step of receiving the arranged data from the sensor circuit by a temporary data storage unit prior to transmission by the broadcast antenna.

* * * * *